(12) United States Patent
Huang et al.

(10) Patent No.: US 8,849,361 B2
(45) Date of Patent: Sep. 30, 2014

(54) INTELLIGENT DETECTION INTERFACE FOR WIRELESS DEVICES

(71) Applicant: Marvell World Trade Ltd., St. Michael (BB)

(72) Inventors: Frank Huang, Pleasanton, CA (US); Benson Chau, Santa Clara, CA (US); Venkatachalam Shanmugasundaram, Cupertino, CA (US); Ken Yeung, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 72 days.

(21) Appl. No.: 13/744,374

(22) Filed: Jan. 17, 2013

(65) Prior Publication Data

US 2013/0183954 A1   Jul. 18, 2013

Related U.S. Application Data

(60) Provisional application No. 61/587,939, filed on Jan. 18, 2012.

(51) Int. Cl.
*H04M 1/00* (2006.01)
*H04W 52/02* (2009.01)

(52) U.S. Cl.
CPC .......... *H04W 52/02* (2013.01); *H04W 52/0274* (2013.01); *Y02B 60/50* (2013.01); *H04W 52/0229* (2013.01)
USPC ...................................................... 455/574

(58) Field of Classification Search
USPC ....................................................... 455/574
See application file for complete search history.

(56) References Cited

U.S. PATENT DOCUMENTS

| | | | |
|---|---|---|---|
| 7,133,374 B2 | 11/2006 | Lo et al. | |
| 7,468,966 B2 | 12/2008 | Baker et al. | |
| 7,502,635 B1 | 3/2009 | Horikoshi et al. | |
| 7,684,835 B1 | 3/2010 | Vu et al. | |
| 7,685,606 B2 | 3/2010 | Chang | |
| 8,170,624 B1 | 5/2012 | Huang et al. | |
| 2002/0132603 A1 | 9/2002 | Lindskog et al. | |
| 2004/0132502 A1 | 7/2004 | Matsumura | |
| 2004/0203389 A1 | 10/2004 | Kojima et al. | |
| 2005/0059386 A1 | 3/2005 | Li | |
| 2005/0086550 A1 | 4/2005 | Hammes et al. | |
| 2005/0101283 A1 | 5/2005 | Kimata | |
| 2005/0190709 A1 | 9/2005 | Ferchland et al. | |

(Continued)

FOREIGN PATENT DOCUMENTS

WO    WO-2008083856 A1    7/2008

OTHER PUBLICATIONS

International Search Report and Written Opinion in corresponding PCT/IB2013/000496 dated Jul. 5, 2013.

(Continued)

*Primary Examiner* — Joel Ajayi

(57) ABSTRACT

In a method for controlling a wireless device assembly coupled to a host assembly, a clock signal is received at the wireless device assembly from the host assembly. The clock signal is supplied to an interface module in the wireless device assembly during a power save mode of the wireless device assembly and is used to operate the interface module. An initialization command is received at the wireless device assembly from the host assembly and is detected with the interface module. In response to detecting the initialization command, at least a portion of the wireless device assembly, other than the interface module, is activated.

20 Claims, 5 Drawing Sheets

(56) References Cited

U.S. PATENT DOCUMENTS

| | | |
|---|---|---|
| 2005/0221869 A1 | 10/2005 | Liu et al. |
| 2006/0240798 A1 | 10/2006 | Jarosinski et al. |
| 2006/0240799 A1 | 10/2006 | Kim et al. |
| 2007/0036096 A1 | 2/2007 | Sinivaara |
| 2007/0037547 A1 | 2/2007 | Cheol |
| 2007/0049238 A1 | 3/2007 | Chen |
| 2007/0238437 A1 | 10/2007 | Jaakkola |
| 2009/0221303 A1 | 9/2009 | Soliman |
| 2010/0217912 A1 | 8/2010 | Rofougaran |

OTHER PUBLICATIONS

Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band, IEEE P802.11g/D8.2 (Apr. 2003).

TGn Sync Proposal Technical Specification, IEEE P802.11 Wireless LANs, Abstract (2005).

Supplement to IEEE Standard for Information Technology—Telecommunications and information exchange between systems—Local and metropolitan area networks—Specific requirements—Part 11: Wireless LAN Medium Access Control (MAC) and Physical Layer PHY speci cations: High-speed Physical Layer in the 5 Ghz Band, IEEE Std 802.11a (1999).

Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: Higher-speed Physical Layer Extension in the 2.4 Ghz Band, IEEE Std. 802.11b (1999).

Wowra, "Approaches to Reduce Energy Consumption of WLAN Devices," Center for Informatics, University of Goettingen 10 pages (2004).

Rohl, "A Short Look on Power Saving Mechanisms in the Wireless LAN Standard Draft IEEE 802,11," Technical University Berlin, Telecommunication Networks Group 6 pages, 1997.

Suh, et al. "Enhanced Power Saving for IEEE 802.11 WLAN with Dynamic Slot Allocation," Graduate School of Information and Communication 10 pages, 2005.

"SD Specifications Part E1 SDIO Simplified Specification," version 2.00 SD Card Association, Feb. 8, 2007.

"SD Card Specification Simplified Version of Part E1 Secure Digital Input/Output (SDIO) Card Specification," Version 1.00, SD Association Oct. 2001.

INTELLIGENT DETECTION INTERFACE FOR WIRELESS DEVICES

CROSS-REFERENCE TO RELATED APPLICATIONS

This disclosure claims the benefit of U.S. Provisional Patent Application No. 61/587,939, filed Jan. 18, 2012, entitled "Intelligent Detection for SIDO Wakeup," the disclosure of which is hereby expressly incorporated herein by reference in its entirety.

FIELD OF TECHNOLOGY

The present disclosure relates generally to communication devices, and more particularly, to techniques for improving power saving operation in a wireless device.

DESCRIPTION OF THE RELATED ART

Wireless networks continue to increase in popularly as consumers migrate toward portable computing device and as manufacturers continue to develop wireless devices with greater functionality. Many consumers routinely install into their homes personal wireless networks that do not enjoy substantial range, but offer considerable bandwidth and ease of installation. On a larger scale, cities have begun deploying wireless networks covering large areas.

There are numerous types of wireless networks and network protocols. Wireless local area networks (WLAN) typically include one of the various Institute of Electrical and Electronics Engineers (IEEE) 802.11 standard wireless protocols, first promulgated in 1999. These protocols include IEEE 802.11a, 802.11b, 802.11n, 802.11g, 802.11ac, etc., which operate at different spectrum bands and/or different multiplexing or spread spectrum schemes to deliver various bit rates to devices on the network.

These wireless networks may be deployed in any of a variety of topologies. With WLAN networks, in particular, there are generally two network topologies: ad-hoc topologies and infrastructure topologies. An ad-hoc network (also termed an Independent Basic Service Set—IBSS) is a peer-to-peer network in which devices communicate directly with one another, without the need of a central host. An infrastructure network, on the other hand, uses a host (e.g., a base station or an access point) to route all data between the supported devices. Infrastructure networks allow wireless devices (or clients) to join and disconnect from the network with greater ease and are typically employed in more long term network environments, whereas ad-hoc networks are generally more short term, as the name implies. Either network configuration may support any number of devices including laptop computers, handheld computers, printers, storage media, and other network equipment, such as hosts, routers, switches, etc. In some examples, such as with Bluetooth networks, the wireless devices may be handheld communicators like cellular telephones or walkie-talkies.

Generally, wireless devices may operate using many different power sources. Some devices use a constant AC power source, while others operate off battery power, while others operate off of either. With the variety of power sources for devices on a network, power consumption has become an important aspect of network operation and thus an important aspect of wireless device operation. Many wireless devices deploy some type of power management protocol that will place the device into a power save mode during periods of non use or reduced use. For example, the IEEE 802.11 standards set forth a power save (PS) mode for wireless devices power in which the devices consume a reduced amount of power from a host. By contrast, in an inactive PS mode, also termed an active or normal operating mode, the wireless devices may sleep or wake as necessary to receive and transmit packet data on the network.

While devices with PS modes are known, controlling the wireless device sleep state does not conserve power in the underlying host for that device. A WLAN secure digital (SD) card for example may have a selectable PS mode, but an SD card generally cannot be powered down prior to initialization of the card by an underlying host of the card (e.g., processor assembly in a laptop computer, mobile phone, digital camera, etc.). Thus, the card consumes power form the host even though the card is not being utilized by the host.

SUMMARY OF THE DISCLOSURE

In an embodiment, a method for controlling a wireless device assembly coupled to a host assembly includes receiving, at the wireless device assembly, a clock signal from the host assembly, supplying the clock signal to an interface module in the wireless device assembly during a power save mode of the wireless device assembly, and using the clock signal from the host assembly to operate the interface module. The method also includes receiving, at the wireless device assembly, an initialization command from the host assembly to the wireless device assembly and detecting, with the interface module, the initialization command. The method further includes in response to detecting the initialization command, activating at least a portion of the wireless device assembly other than the interface module.

In other embodiments, the method includes any combination of one or more of the following elements.

Detecting the initialization command comprises detecting a presence of a signal at an interface of the wireless device assembly and determining that the detected signal corresponds to the initialization initiation command.

Activating at least the portion of the wireless device assembly comprises bringing one or more modules in the wireless device assembly out of the power save mode.

The method further comprises receiving, at the wireless device assembly, one or more subsequent initialization initiation commands from the host device assembly, using the interface module to, in response to receiving each of the one or more subsequent initialization initiation commands, transmit a respective initialization initiation response.

The respective initialization initiation response includes, prior to completion of activation of at least the portion of the wireless device assembly, an indication that the wireless device assembly is not ready to receive subsequent commands or when activation of at least the portion of the wireless device assembly is completed, an indication that the wireless device assembly is ready to receive subsequent commands.

The method further comprises after transmitting the initialization response indicating that the wireless device assembly is ready for communication with the host assembly, receiving, at the wireless device assembly, one or more additional commands from the host assembly to complete initialization of the wireless device assembly.

The method further comprises upon completing initialization of the wireless device assembly, transitioning the wireless device assembly to the power save mode if no further commands are received from the host assembly, wherein the interface module remains operational during the power save mode of the wireless device assembly.

The method further comprises receiving, at the wireless device assembly, an i/o enable command from the host assembly, detecting, with the interface module, the i/o enable command, and in response to detecting the i/o command, activating the wireless device assembly.

Detecting the i/o enable command comprises detecting a presence of a signal at an interface of the wireless device assembly and determining that the detected signal corresponds to the i/o enable command.

Activating the wireless device assembly comprises bringing the wireless device assembly out of the power save mode.

The method further comprises receiving, at the wireless device assembly, one or more subsequent i/o enable commands from the host device assembly and using the interface module to, in response to receiving each of the one or more subsequent i/o enable commands, transmit a respective i/o enable response.

The respective i/o enable response includes, prior to completion of activation of the wireless device assembly, an indication that the wireless assembly is not ready to receive subsequent commands or when activation of the wireless device assembly is completed, an indication that the wireless device assembly is ready to receive subsequent commands.

The method further comprises after transmitting the i/o enable response indicating that the wireless device assembly is ready for communication with the host assembly, beginning normal communication with the host assembly.

The interface module is implemented in hardware.

In another embodiment, a wireless device assembly configured to communicate wirelessly with one or more other devices comprises an interface to communicate with a host assembly and an interface module configured to detect an initialization command sent from the host assembly to the wireless device assembly during a power save mode of the wireless device assembly. The interface module is also configured to, in response to detecting the initialization command, begin activation of at least a portion of the wireless device assembly other than the interface module. The interface module is operated using a clock signal from the host assembly.

In other embodiments, the wireless device assembly includes any combination of one or more of the following elements.

The interface module is configured to detect the initialization command at least by detecting a presence of a signal at an interface of the wireless device assembly and determining that the signal corresponds to the initialization initiation command.

The interface module is configured to activate at least the portion of the wireless device assembly at least by bringing one or more modules in the wireless device assembly out of the power save mode.

The interface module is further configured to receive one or more subsequent initialization initiation commands from the host device assembly to the wireless device assembly, and in response to receiving each of the one or more subsequent initialization commands, transmit a respective initialization response.

The respective initialization response includes, prior to completion of activation of at least the portion of the wireless device assembly, an indication that the wireless device assembly is not ready to receive subsequent commands or when activation of at least the portion of the wireless device assembly is completed, an indication that the wireless device assembly is ready to receive subsequent commands.

The interface module is further configured to after transmitting the initialization response indicating that the wireless device assembly is ready for communication with the host assembly, receive one or more additional commands from the host assembly to complete initialization of the wireless device assembly.

The wireless device assembly is configured to upon completing initialization of the wireless device assembly, transition to the power save mode if no further commands are received from the host assembly, wherein the interface module remains operational during the power save mode of the wireless device assembly.

The interface module is further configured to detect an i/o enable command sent form the host assembly to the wireless device assembly, and in response to detecting the i/o command, activate the wireless device assembly.

The interface module is configured to detect the i/o enable command at least by detecting a presence of a signal at an interface of the wireless device assembly, and determining that the signal at the interface of the wireless device assembly is the i/o enable command.

The interface module is configured to activate the wireless device assembly at least by bringing the wireless device assembly out of the power save mode.

The interface module is further configured to receive one or more subsequent i/o enable commands from the host device assembly to the wireless device assembly, and in response to receiving each of the one or more subsequent i/o enable commands, transmit a respective i/o enable response.

The respective i/o enable response includes, prior to completion of activation of the wireless device assembly, an indication that the wireless assembly is not ready to receive subsequent commands or when activation of the wireless device assembly is completed, an indication that the wireless device assembly is ready to receive subsequent commands.

After transmitting the i/o enable response indicating that the wireless device assembly is ready for communication with the host assembly, the wireless device assembly begins normal communication the host assembly.

The interface module is implemented in hardware.

DETAILED DESCRIPTION

Figure 1:
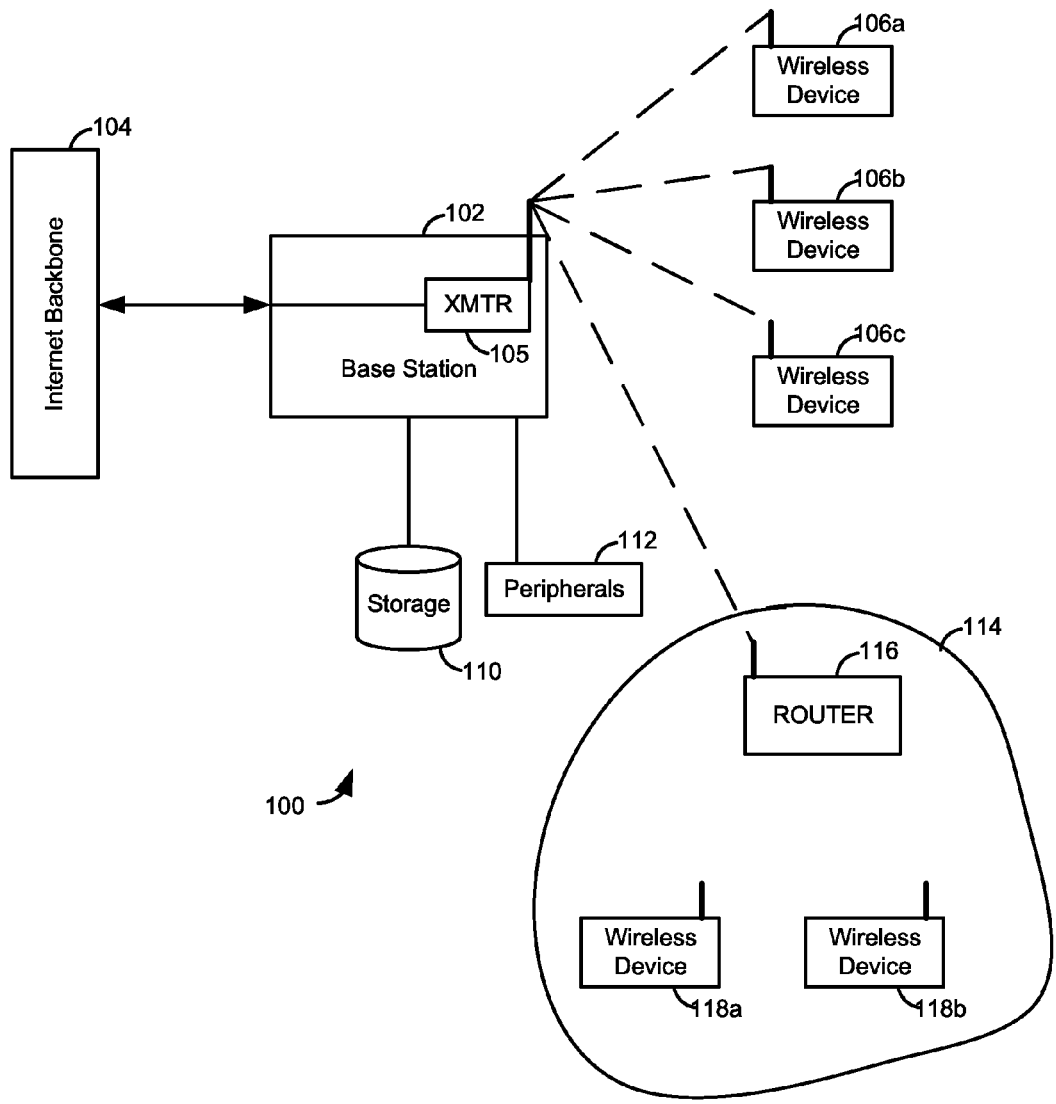
FIG. 1 is a diagram illustrating a wireless network including a host device establishing the wireless network and a plurality of wireless devices coupled to a base station or access point, according to an embodiment.

FIG. 1 is a block diagram of an example wireless network 100, which represents a short range or long range network and which is described below as being in an infrastructure topology with a base station 102 serving as a base station or access point, according to an embodiment. In the illustrated example, the base station 102 represents a computer system, such as, for example, a dedicated wireless base station, router, or switch, connected to a main computer. However, the base station 102 represents a wireless network card or other hardware inserted into a computer system, router, base station, etc., in other embodiments. In a WLAN environment, the base station 102 (as well as the connected wireless devices) is compliant with one of the accepted or contemplated wireless communications protocols, of which IEEE 802.11 protocol (e.g., IEEE 802.11a, 802.11b, 802.11g, 802.11n, 802.11ac, etc.), Bluetooth, etc., in some example embodiments. However, these are only provided by way of example, and the base station 102 operates under other suitable wireless protocol in other embodiments.

In an embodiment, the base station 102 is coupled to an Internet backbone 104, which generally contains a series of Internet service providers and act as a network gateway so that the base station 102 is able to transmit and receive data over the Internet. The backbone 104 is at the premises of the base station 102, as in the case of a wireless base station serving as the network host and coupled to a digital subscribe line (DSL) or cable modem acting as a front user end of Internet backbone 104, according to an embodiment. In other embodiments, the base station 102 represents a more integrated device with both modulation/demodulation capabilities and wireless routing capabilities and connected directly to the service provide headend acting as the backbone 104.

The base station 102 includes a transmitter 105 that communicates with numerous wireless devices (or clients) 106A-106C. In various embodiments, each of the wireless devices 106A-106C includes software, hardware, or firmware based drivers that allow the respective devices to connect to and communicate via the network using the base station 102 as a routing point or access point. By way of example, the wireless devices 106A-106C represent wireless terminals, personal handheld devices, laptop computers, wireless supported desktop computers, intelligent phones (e.g., GSM based telephones), gaming systems, or other wireless networking devices, such as routers, switches, etc., in some example embodiments.

In at least some embodiments, one or more of the wireless devices 106A-106C includes a host device, or assembly, that performs the primary processing functions, and a wireless device assembly, which is plug insertable, for example, into the host assembly and which communicates wirelessly with the base station 102. In an embodiment, the host assembly has at least two operating modes, a host sleep (HS) mode and a normal operating mode. Similarly, in some embodiments, the wireless device assembly has an active power save (PS) mode and an inactive PS mode, where in the later the device is asleep and operating under reduced power consumption. Additionally or alternatively, in some embodiments, the wireless device assembly is able to enter a PS mode prior to being initialized by the host assembly and, therefore, prior to beginning any communication within a wireless network, while still being responsive to initialization commands subsequently issued by the host assembly, as will be explained in more detail below.

In the illustrated example, the base station 102 is also coupled to a storage media 110, such as an external storage drive, and a peripheral 112, such as a printer, either of which may be accessible to a wireless device on the network 100. In the illustrated example, these devices are external and coupled to the base station 102 through wired connections. The base station 102 is also coupled to another wireless network 114 via a router 116 which is wirelessly connected to devices 118A and 118B, in an embodiment.

Figure 2:
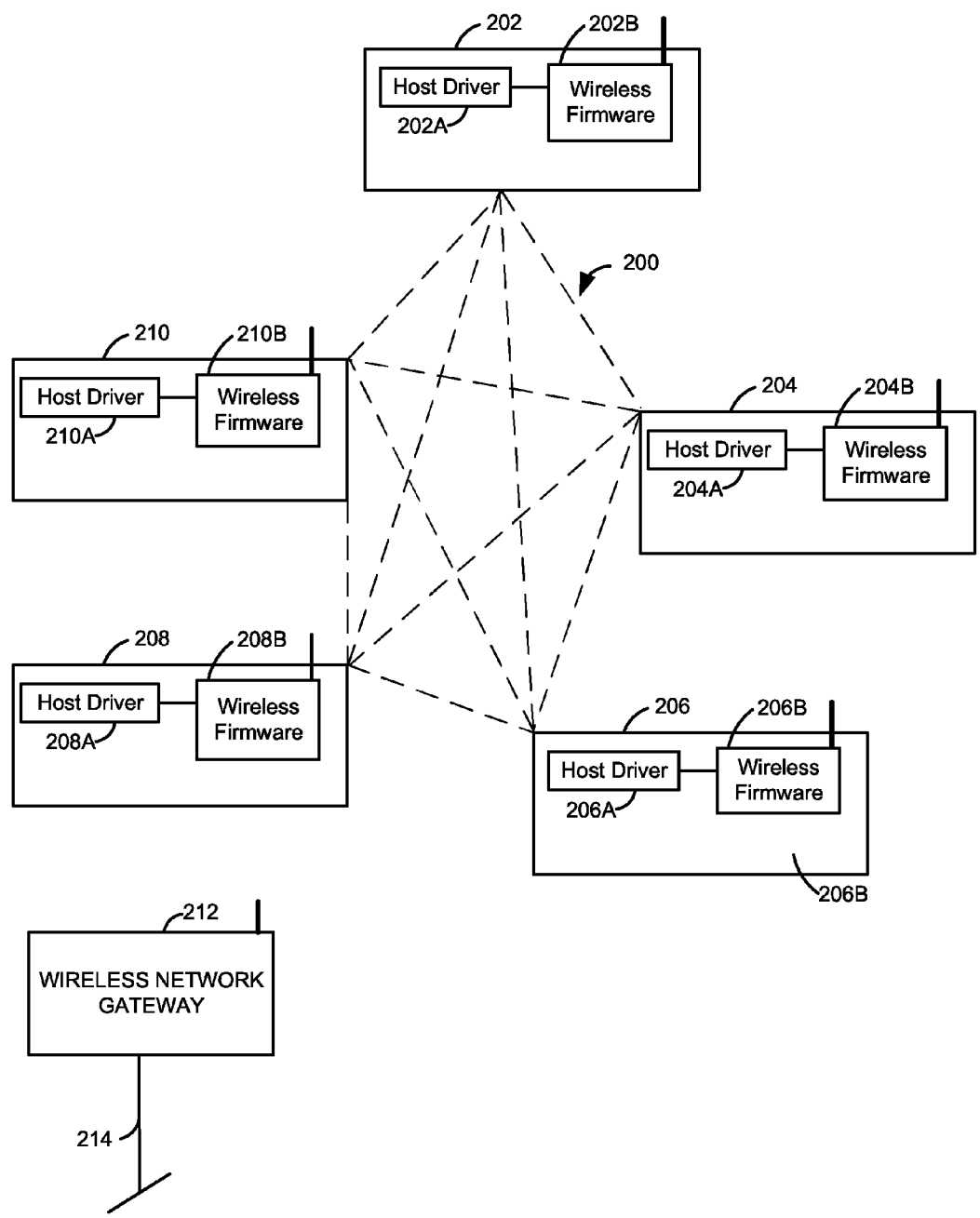
FIG. 2 is a block diagram of a wireless network in an ad-hoc configuration, according to an embodiment.

FIG. 2 illustrates an ad-hoc or peer-to-peer network 200 comprising independently communicating devices 202-210 forming the ad-hoc network 200 and capable of communicating directly with one another, according to an embodiment. The devices 202-210 include host drivers 202A-210A, respectively, each coupled to a wireless assembly 202B-210B to establish and maintain the ad-hoc network 200. According to an embodiment, in the illustrated configuration, each wireless device 202-210 has a PS mode with respect to the ad-hoc network 100, i.e., where one or more of the devices would not be able to communicate with other devices, while each wireless device 202-210 could still operate in an active mode with respect to the gateway 212. In an ad-hoc topology, each of the clients 202-210 will operate as a separate node capable of communicating data to the other nodes, and these nodes 202-210 support local devices connected thereto. In an ad-hoc topology, at least some of the local devices are able to communicate directly with other nodes on the ad-hoc network, while some other local devices are unable to communicate directly with other nodes on the ad-hoc network.

Figure 3:
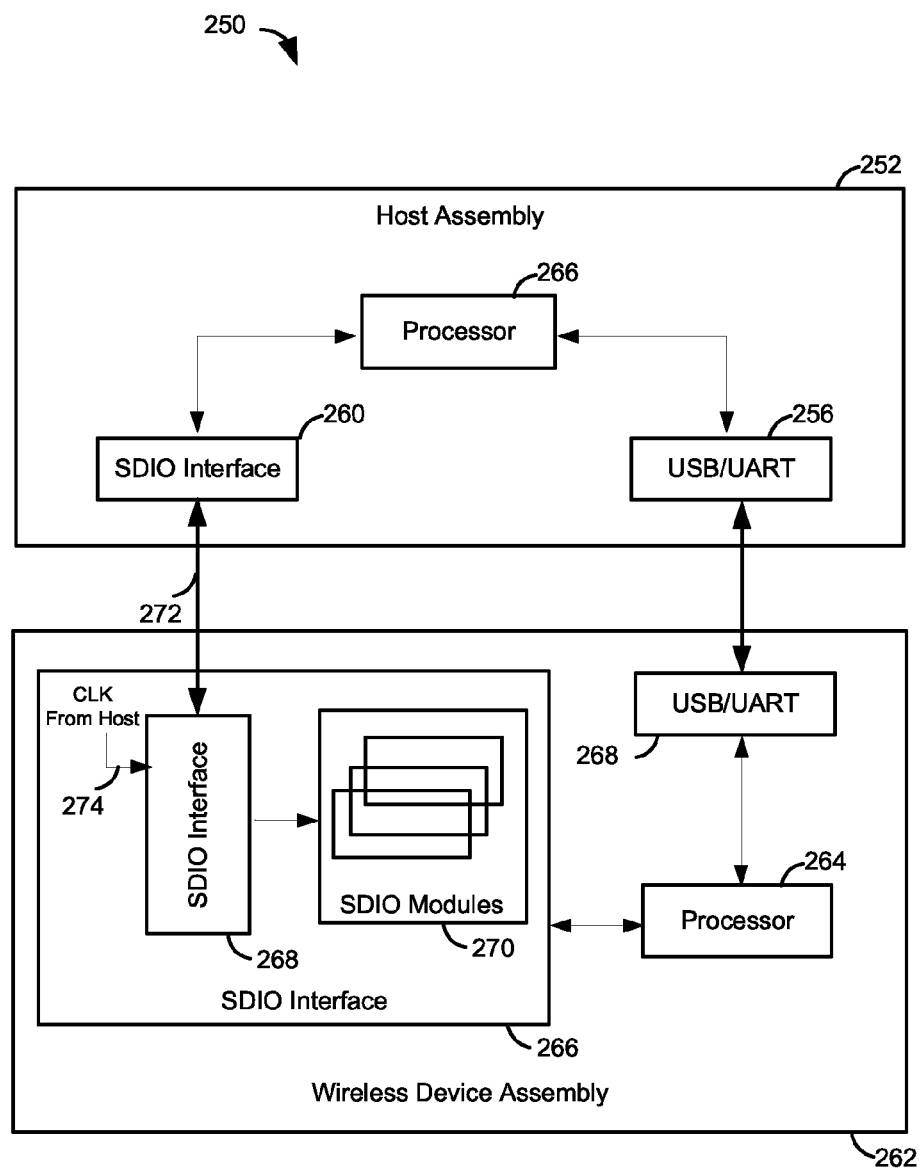
FIG. 3 is a block diagram of a wireless device having a host assembly and wireless device assembly connected thereto as may be used in an infrastructure or ad-hoc network configuration, according to an embodiment.

FIG. 3 illustrates an example implementation of a wireless device 250, according to an embodiment. In various embodiments, the wireless device 250 is used in any of the network configurations of FIG. 1 or 2, for example. The wireless device 250 includes a host assembly 254 which includes a processor 266 which controls the operation of the host assembly 254 and processes packet data received a wireless network. In some embodiments, the host assembly 252 further includes additional components, such as, for example, a test action port, e.g., joint task action group (JTAG) port (not shown).

In the illustrated embodiment, the host assembly 252 further includes a secure digital input/output (SDIO) interface 266 that connects the host assembly 252 to a wireless device assembly 262. In an embodiment, the wireless device assembly 262 is a WLAN device capable of communicating over a wireless network with an access point, such as a base station, although in other examples, the WLAN device assembly 262 functions as an access point. In the illustrated example, the wireless device assembly 262 includes a central processor or chipset 264 generally used to control operation of the wireless device assembly 262. The wireless device also includes a SDIO Interface module 266 that, in conjunction with the processor 264, controls interfacing between the wireless device assembly 262 and the host assembly 252. In some embodiments, the wireless device assembly 262 also includes one or more additional interfaces that connect the wireless device assembly 262 and the host assembly 252. For example, in the embodiment of FIG. 2, the wireless assembly 262 includes a universal serial bus (USB) or a universal asynchronous receiver/transmitter (UART) interface 268 coupled to the USB or a UART interface 256 of the host assembly 252. However, in some embodiments, the USB/UART interface 256 and/or the USB/UART interface 268 is omitted from the wireless device 250, and communications between the wireless device assembly 262 and the host assembly 252 are limited to communications between the SDIO interface 266 and the SDIO interface 260.

In an embodiment, the SDIO interface 266 includes an SDIO interface module 268 coupled to one or more function modules 270. In an embodiment, the wireless device assembly 262 receives a clock signal 274 from the host assembly 252, for example via the SDIO interface connection 272, and the clock signal 274 is supplied to the SDIO detection module 268. As will be explained in more detail below, the SDIO interface module 268 is used, among other things, to detect commands sent by the host assembly 254 during a power save mode of the wireless assembly 262. Other components of the wireless device assembly 262, such as the SDIO modules 270 and the processor 264, are generally operated using clock signals generated internally to the wireless device assembly 262, in an embodiment. Accordingly, in this embodiment, the SDIO interface module 268 operates using a clock domain separate from the clock domain utilized by the other components of the wireless device assembly 262, at least during a power save mode operation of the wireless device assembly 262. In some embodiments, the SDIO interface module 268 is a hardware module, while the other modules of the wireless device assembly 262 are implemented in firmware and/or software. Because the SDIO interface module 268 operates using a clock signal supplied by the host assembly 254, this module remains operational during a power save mode of the wireless device assembly 262, when the internal clock of the wireless device assembly 262 is not functional. In at least some embodiments, operating the SDIO interface module 268 using the host clock signal 274 allows the wireless device assembly 262 to detect certain commands issued by the host assembly 252 during a power save mode of the wireless device assembly 262 and, in response to detecting the command (or commands), activate at least appropriate portions of the wireless device assembly 262 to enable further communications between the host assembly 252 and the wireless device assembly 262.

Figure 4:
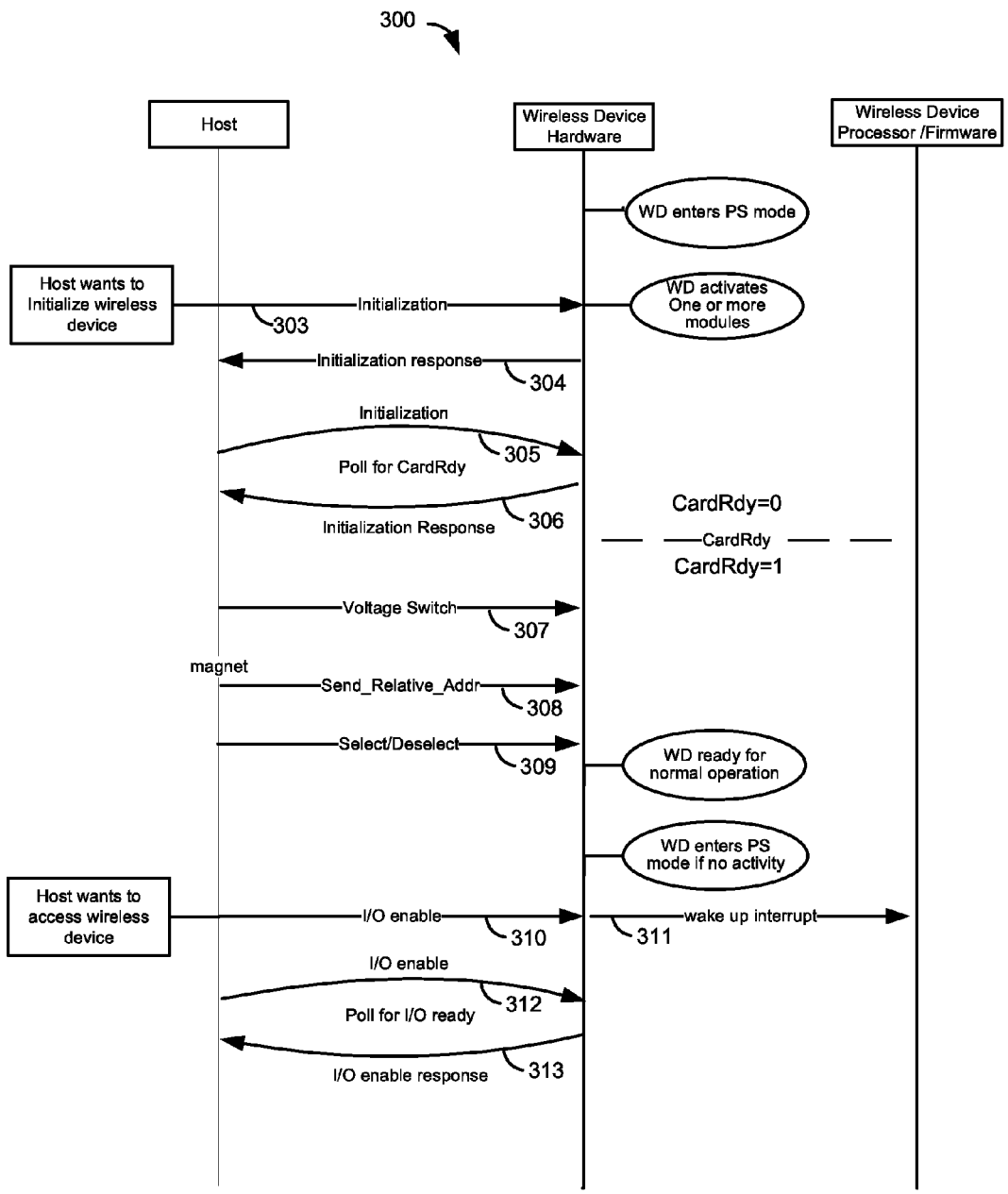
FIG. 4 illustrates an example implementation of a wireless device assembly power save mode, according to an embodiment.

FIG. 4 illustrates an example implementation of a wireless device assembly power save mode 300, according to an embodiment. The power save mode 300 is implemented by the wireless device 250 of FIG. 3, in one embodiment. In another embodiment, the power save mode 300 is implemented by another suitable wireless device. Similarly, the wireless device 250 implements a power save mode different from the power save mode 300, in some embodiment. For ease of explanation, the power save mode 300 is described below as implemented by the wireless device 250 of FIG. 3.

In an embodiment, the wireless device assembly 262 enters power save mode prior to initialization of the wireless device assembly 262 by the host assembly 252, for example upon power up of the wireless device 250 or upon a reset of the wireless device assembly 262. Thereafter, the host assembly 252 wishes to initialize the wireless device 262 during the power save mode of the wireless device 262. At least prior to initialization of the wireless device assembly 262, the host assembly 252 is unaware that the wireless device assembly 262 is operating in a power save mode, in an embodiment. To initialize the wireless device assembly 262, the host assembly 252 transmits an initialization signal or command 303 to the wireless device assembly 262. In an embodiment, the SDIO interface detection module 268 of the wireless device assembly is able to detect the signal 303, and to recognize or determine that the signal 303 is an initialization command sent from the host assembly 252. In response to detecting the presence of the signal 303 at the interface connection 272 of the wireless device assembly 262, and determining that the signal 303 is an initialization command from the host assembly 252, the SDIO interface module 268 transmits an initialization response 304 to the host assembly 252 and begins a process of activating at least a portion of the wireless device assembly 262. For example, the SDIO detection module 268 activates, or bring out of the power save mode, at least the modules 270 of the SDIO interface 266 that are needed to properly complete initialization of the wireless device assembly 262 by the host assembly 252, in an embodiment.

The host assembly 252 receives the initialization response 304 from the wireless assembly 262, and transmits one or more subsequent initialization command 305 to the wireless device assembly 262 to poll the wireless device assembly 262 for an indication that the wireless device assembly 262 is ready for further communication with the host assembly 252. In response to receiving the subsequent initialization command 305 from the host assembly 252, the SDIO interface module 268 responds to the host assembly 252 with a subsequent initialization response 306. In an embodiment, the initialization response 306 is used, among other things, to indicate to the host assembly 252 whether or not the wireless device assembly 262 is ready to receive further commands from the host assembly 252. For example, in an embodiment, the initialization response 306 includes a "CardRdy" field that is set to a logic one (1) to indicate that the wireless device assembly is ready for receiving further commands from the host assembly 252 or to a logic (0) to indicate that the wireless device assembly 262 is not yet ready to receive further commands, or vise versa. In an embodiment, prior to completion of activation of the appropriate portion of the wireless device assembly 266, the initiation response 305 transmitted by the SDIO interface 268 includes an indication that the wireless device assembly 266 indicating that the wireless device assembly 266 is not ready to receive subsequent commands from the host assembly 252. When activation of the appropriate portion of the wireless device assembly 262 is completed, the initiation response 305 transmitted by the SDIO interface 268 includes an indication that the wireless device assembly 266 that the wireless device assembly 266 is ready to receive subsequent commands from the host assembly 252, in this embodiment. The host assembly 252 continues to poll the wireless device assembly 262 until an indication that the wireless device assembly 262 is ready for further communication with the host assembly 252 is received from the wireless device assembly 262, in an embodiment.

In an embodiment, upon receiving the indication that the wireless device assembly 262 is ready for receiving further commands, the host assembly 302 continues the initialization of the wireless device assembly 262. For example, the host assembly 252 transmits a voltage switch command 307 to the wireless device assembly 262 to set up proper voltage levels for subsequent operation of the wireless device assembly 262. The SDIO interface module 268 receives the voltage switch command 306 and sets up the proper voltage levels for the wireless device assembly 262 indicated in the voltage switch command 307. Upon successful completion of the voltage switch operation initiated by the voltage switch command 307, the SDIO module 268 responds with a voltage switch response (not shown) indicating that the voltage switch operation has been completed by the wireless device assembly 262, for example by setting a "CardRdy" bit in the voltage switch command response to a value (e.g., 0 or 1) that indicates that the wireless device assembly is ready for receiving subsequent commands from the host assembly 252.

In an embodiment, in response to receiving the voltage switch command response indicating that the voltage switch operation has been completed by the wireless device assembly 262, the host assembly 252 continues the initialization process by transmitting one or more additional commands to further configure the wireless device assembly 262. For example, in the embodiment illustrated in FIG. 4, the host assembly 262 sends a send_relative_addr command 308 to inform the wireless assembly 262 of the system address of the wireless assembly 262 in the wireless device 250, in an embodiment. Then, the host assembly 252 sends a select/deselect command 309 to indicate to the wireless device assembly 262 that the wireless device assembly 262 is selected for further operation within the wireless device 250, in the illustrated embodiment. The wireless device assembly 262 receives the send_relative_addr command 308 and select/deselect command 310 and configures the SDIO interface 266 according to the the send_relative_addr command 308 and select/deselect command 310. This completes the initialization process of the wireless device assembly 262, in an embodiment. Upon completion of the initialization process, the wireless device assembly 262 enters a command ready state and is ready for receiving and processing subsequent commands from the host assembly 252, such as, for example, read and write for retrieving packet data from or for transfer packet data to the wireless device assembly 262.

According to an embodiment, after initialization of the wireless device assembly 262 is completed, the wireless device assembly 262 enters the power save mode, for example, if no further communication occurs between the wireless device assembly 262 and the host assembly 252 for a certain period of time. As discussed above, in an embodiment, during the power save mode of the wireless device 262, internal clock is not generated in the wireless device assembly 262, and the components of the wireless device 252 operated using the internal clock are not functional during the power save mode of the wireless device assembly 262. The SDIO interface module 268, however, utilizes the clock signal 274 from the host assembly 252, and therefore this module is functional during the power save mode of the wireless device assembly 262.

In an embodiment, when the host device assembly 252 subsequently wishes to access the wireless device assembly 262, for example to initiate a packet data transfer to or packet data retrieval from the wireless device assembly 262, the host assembly 252 transmits an i/o enable signal or command 310 to the wireless device assembly 262. In an embodiment, the SDIO interface module 268 detects the signal 310 and determines that the signal 310 is an i/o enable command. In response to determining that the command 310 is an i/o enable command from the host assembly 252, the SDIO interface module 268 activates appropriate modules 270 of the SDIO interface 266, as well as the processor 264, to prepare the wireless device assembly 262 for further communication with the host assembly 252. To activate the processor 264, the SDIO interface module 268 transmits a wake up interrupt signal 311 to the processor 246, in an embodiment. Similar to the initialization polling discussed above, during the activation process of the wireless device assembly 262, the host assembly 252 continually polls the wireless device assembly 262 to determine when the wireless device assembly 262 is ready for receiving further commands form the host assembly 252. Upon completion of the activation process, the wireless device assembly 262 sends an i/o enable response 313 to the host assembly 252 indicating that the wireless assembly 262 is ready for further communication with the host assembly 252, for example using an IO RDY indication field included in the i/o enable response 314. For example, in an embodiment, the I/O RDY field included in the i/o enable response 314 is set to a logic 0 to indicate that the wireless device assembly 262 is not ready for further communication with the host assembly 252 (for example, if the activation process of the wireless device assembly 262 has not yet been completed), and set to a logic 1 to indicate that the wireless device assembly 262 ready for further communication with the host assembly 252 (for example when activation of the wireless device assembly 262 is completed), or vise versa.

In an embodiment, upon receiving the i/o enable response 314 indicating that the wireless device assembly 262 is ready for further communication with the host assembly 252, the host assembly 252 determines whether appropriate firmware has been downloaded to the wireless device assembly 262, for example by retrieving information from one or more appropriate registers in the SDIO interface card 266. If the host assembly 252 determines that the appropriate firmware has not been downloaded to the wireless device assembly 262, the host assembly 252 initiates the process of downloading the appropriate firmware to the wireless device assembly 262, for example by sending firmware packets to the wireless device assembly 262. Upon successful download of appropriate firmware to the wireless device assembly 262, the host assembly initializes the downloaded firmware, for example by transmitting a firmware initialization command to the wireless device assembly 252, in an embodiment. The SDIO interface module 268 receives the firmware packets from the host assembly 252 and passes the packet the processor 264, in an embodiment. On the other hand, if the host assembly 252 determines that the wireless device assembly 262 already contains appropriate firmware, the host assembly 252 initializes the firmware already contained in the wireless device assembly 262 by transmitting a firmware initialization command to the wireless device assembly 262, for example. Alternatively, in some embodiments and/or scenarios, the host assembly 252 does not verify the firmware in the wireless device assembly 252 but simply initiates subsequent operations (e.g., read/write operations) with respect to the wireless device assembly 262 upon receiving the indication that the wireless device assembly 262 is ready for subsequent operation.

Figure 5:
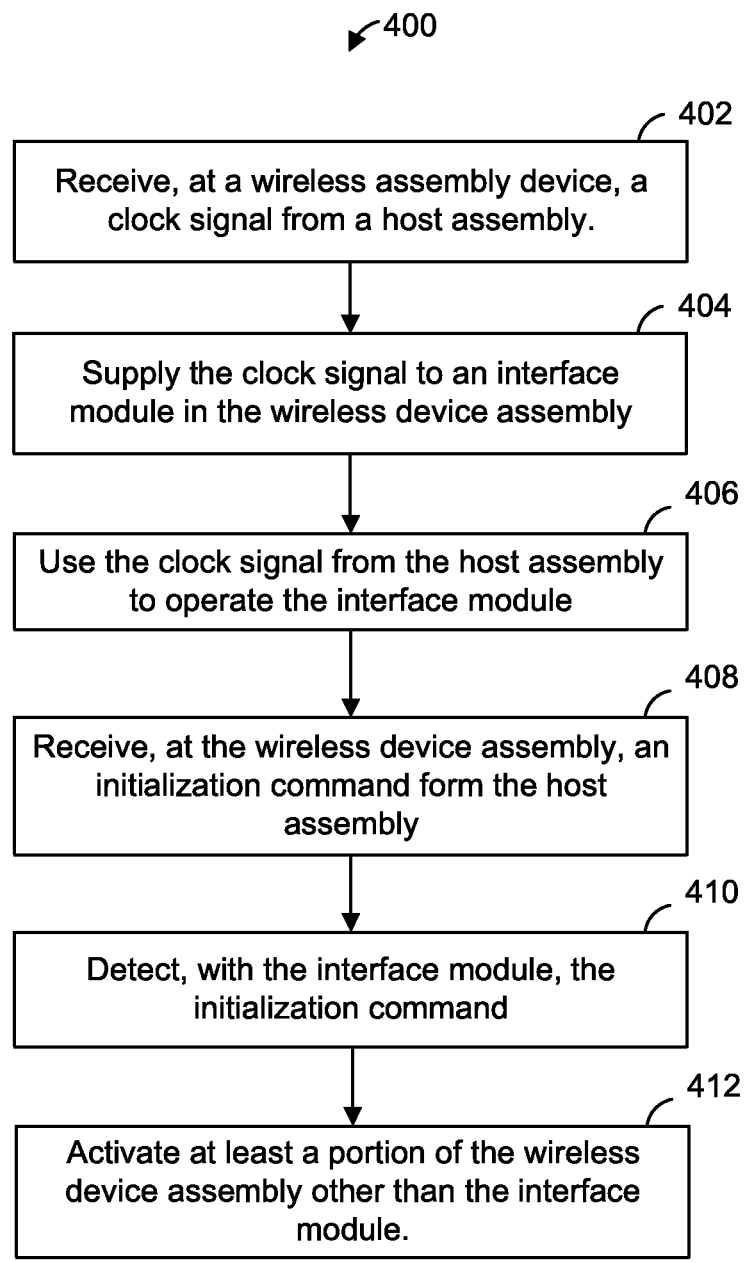
FIG. 5 is a flow diagram of an example method 400 for controlling a wireless device assembly coupled to a host assembly, according to an embodiment.

FIG. 5 is a flow diagram of an example method 400 for controlling a wireless device assembly coupled to a host assembly, according to an embodiment. With reference to FIGS. 1 and 2, respectively, the method 400 is performed in a wireless device 106 or a wireless device 202-210, in some embodiments. Referring now to FIG. 3, the method 400 is performed by the wireless device assembly 262, in an embodiment. In other embodiments, the method 400 is performed by other suitable communication devices Similarly, the wireless devices 106, 202-210 and/or 250 perform other suitable methods for controlling wireless device assemblies, in other embodiments.

At block 402, a clock signal is received at a wireless device assembly from a host assembly, and at block 404, the clock signal is supplied to an interface module in the wireless device assembly. Referring to FIG. 2, for example, in an embodiment, the clock signal 274 is received at the wireless device 262 from the host assembly 252, and the clock signal is supplied to the SDIO interface module 268, in an embodiment. In other embodiments, another suitable clock signal is received and/or the clock signal is supplied to another suitable module. In an embodiment, the clock signal form the host assembly is used to operate the interface module, as indicated at block 406.

At block 408, an initialization command is received at the wireless device assembly from the host device assembly. Referring to FIG. 4, for example, the initialization command 303 is received, in an embodiment. In another embodiment, another suitable signal for initiating initialization of the wireless assembly is received. At block 410, the interface module is used to detect the initiation signal. In an embodiment, the interface module is capable of detecting the initiation signal at block 410 at least because the interface module is operating using a clock signal from the host assembly. At block 412, in response to detecting the initialization signal at block 410, at least a portion of the wireless device assembly is activated. For example, at least a portion of the wireless assembly is brought out of the power save mode at block 412 to allow the host assembly to complete initialization of the wireless device assembly, in an embodiment.

As described, the various techniques described above may be implemented in hardware, firmware, software, or a combination of hardware, firmware, and/or software. When implemented in software, the software may be stored in any computer readable memory such as on a magnetic disk, an optical disk, or other storage medium, in a RAM or ROM or flash memory of a computer, processor, integrated circuit, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for controlling a wireless device assembly coupled to a host assembly, the method comprising:
   receiving, at the wireless device assembly, a clock signal from the host assembly;
   supplying the clock signal to an interface module in the wireless device assembly during a power save mode of the wireless device assembly;
   using the clock signal from the host assembly to operate the interface module;
   receiving, at the wireless device assembly, an initialization command from the host assembly to the wireless device assembly;
   detecting, with the interface module, the initialization command; and
   in response to detecting the initialization command, activating at least a portion of the wireless device assembly other than the interface module.

2. A method according to claim 1, wherein detecting the initialization command comprises:
   detecting a presence of a signal at an interface of the wireless device assembly;
   determining that the detected signal corresponds to the initialization initiation command.

3. A method according to claim 1, wherein activating at least the portion of the wireless device assembly comprises bringing one or more modules in the wireless device assembly out of the power save mode.

4. A method according to claim 1, further comprising:
   receiving, at the wireless device assembly, one or more subsequent initialization initiation commands from the host device assembly;
   using the interface module to, in response to receiving each of the one or more subsequent initialization initiation commands, transmit a respective initialization initiation response, wherein the respective initialization initiation response includes,
      prior to completion of activation of at least the portion of the wireless device assembly, an indication that the wireless device assembly is not ready to receive subsequent commands or
      when activation of at least the portion of the wireless device assembly is completed, an indication that the wireless device assembly is ready to receive subsequent commands; and
   after transmitting the initialization response indicating that the wireless device assembly is ready for communication with the host assembly, receiving, at the wireless device assembly, one or more additional commands from the host assembly to complete initialization of the wireless device assembly.

5. A method according to claim 4, further comprising:
   upon completing initialization of the wireless device assembly, transitioning the wireless device assembly to the power save mode if no further commands are received from the host assembly, wherein the interface module remains operational during the power save mode of the wireless device assembly.

6. A method according to claim 5, further comprising:
   receiving, at the wireless device assembly, an i/o enable command from the host assembly;
   detecting, with the interface module, the i/o enable command; and
   in response to detecting the i/o command, activating the wireless device assembly.

7. A method according to claim 6, wherein detecting the i/o enable command comprises:
   detecting a presence of a signal at an interface of the wireless device assembly; and
   determining that the detected signal corresponds to the i/o enable command.

8. A method according to claim 6, wherein activating the wireless device assembly comprises bringing the wireless device assembly out of the power save mode.

9. A method according to claim 6, further comprising:
   receiving, at the wireless device assembly, one or more subsequent i/o enable commands from the host device assembly;
   using the interface module to, in response to receiving each of the one or more subsequent i/o enable commands, transmit a respective i/o enable response, wherein the respective i/o enable response includes,
      prior to completion of activation of the wireless device assembly, an indication that the wireless assembly is not ready to receive subsequent commands or
      when activation of the wireless device assembly is completed, an indication that the wireless device assembly is ready to receive subsequent commands; and
   after transmitting the i/o enable response indicating that the wireless device assembly is ready for communication with the host assembly, beginning normal communication with the host assembly.

10. A method according to claim 1, wherein the interface module is implemented in hardware.

11. A wireless device assembly configured to communicate wirelessly with one or more other devices, the wireless device assembly comprising:
    an interface to communicate with a host assembly; and
    an interface module configured to:

detect an initialization command sent from the host assembly to the wireless device assembly during a power save mode of the wireless device assembly; and in response to detecting the initialization command, begin activation of at least a portion of the wireless device assembly other than the interface module;

wherein the interface module is operated using a clock signal from the host assembly.

12. A wireless device assembly according to claim 11, wherein the interface module is configured to detect the initialization command at least by:

detecting a presence of a signal at an interface of the wireless device assembly; and determining that the signal corresponds to the initialization initiation command.

13. A wireless device assembly according to claim 11, wherein the interface module is configured to activate at least the portion of the wireless device assembly at least by bringing one or more modules in the wireless device assembly out of the power save mode.

14. A wireless device assembly according to claim 11, wherein the interface module is further configured to:

receive one or more subsequent initialization initiation commands from the host device assembly to the wireless device assembly;

in response to receiving each of the one or more subsequent initialization commands, transmit a respective initialization response, wherein the respective initialization response includes, prior to completion of activation of at least the portion of the wireless device assembly, an indication that the wireless device assembly is not ready to receive subsequent commands or when activation of at least the portion of the wireless device assembly is completed, an indication that the wireless device assembly is ready to receive subsequent commands; and after transmitting the initialization response indicating that the wireless device assembly is ready for communication with the host assembly, receive one or more additional commands from the host assembly to complete initialization of the wireless device assembly.

15. A wireless device assembly according to claim 14, wherein the wireless device assembly is configured to:

upon completing initialization of the wireless device assembly, transition to the power save mode if no further commands are received from the host assembly, wherein the interface module remains operational during the power save mode of the wireless device assembly.

16. A wireless device assembly according to claim 15, wherein the interface module is further configured to:

detect an i/o enable command sent form the host assembly to the wireless device assembly; and in response to detecting the i/o command, activate the wireless device assembly.

17. A wireless device assembly according to claim 16, wherein the interface module is configured to detect the i/o enable command at least by:

detecting a presence of a signal at an interface of the wireless device assembly; and determining that the signal at the interface of the wireless device assembly is the i/o enable command.

18. A wireless device assembly according to claim 16, wherein the interface module is configured to activate the wireless device assembly at least by bringing the wireless device assembly out of the power save mode.

19. A wireless device assembly according to claim 16, wherein the interface module is further configured to:

receive one or more subsequent i/o enable commands from the host device assembly to the wireless device assembly, and in response to receiving each of the one or more subsequent i/o enable commands, transmit a respective i/o enable response, wherein the respective i/o enable response includes, prior to completion of activation of the wireless device assembly, an indication that the wireless assembly is not ready to receive subsequent commands or when activation of the wireless device assembly is completed, an indication that the wireless device assembly is ready to receive subsequent commands; and wherein, after transmitting the i/o enable response indicating that the wireless device assembly is ready for communication with the host assembly, the wireless device assembly begins normal communication the host assembly.

20. A wireless device assembly according to claim 16, wherein the interface module is implemented in hardware.

* * * * *